July 4, 1961

L. H. DIAMOND ET AL 2,991,448

ELEVATOR ANNOUNCING SYSTEM

Filed March 28, 1956

LEW H. DIAMOND
JOHN H. McCONNELL } INVENTORS
HENRY B. BROWN

BY  *J. L. Sharon*  ATTORNEY

July 4, 1961

L. H. DIAMOND ET AL 2,991,448

ELEVATOR ANNOUNCING SYSTEM

Filed March 28, 1956

LEW H. DIAMOND
JOHN H. McCONNELL } INVENTORS
HENRY B. BROWN

BY  *J. L. Sharon*  ATTORNEY

July 4, 1961 L. H. DIAMOND ET AL 2,991,448
ELEVATOR ANNOUNCING SYSTEM
Filed March 28, 1956 8 Sheets-Sheet 6
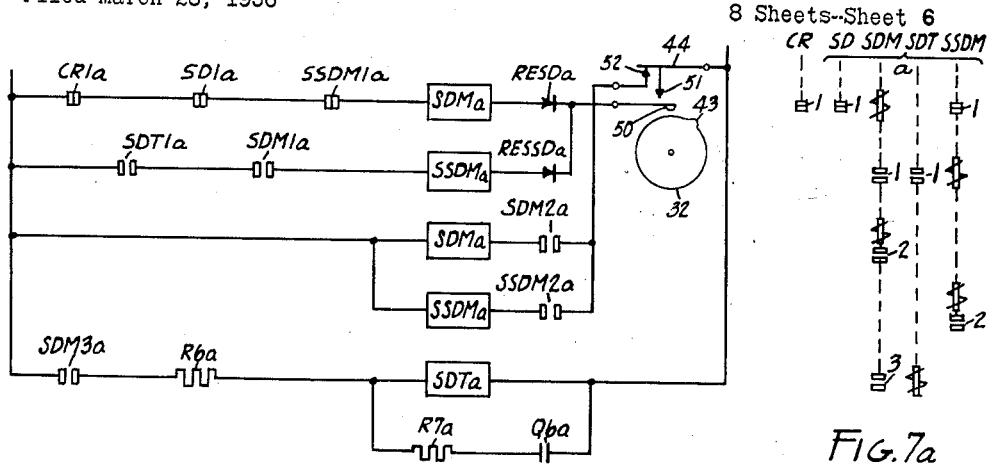
FIG. 7
FIG. 7a
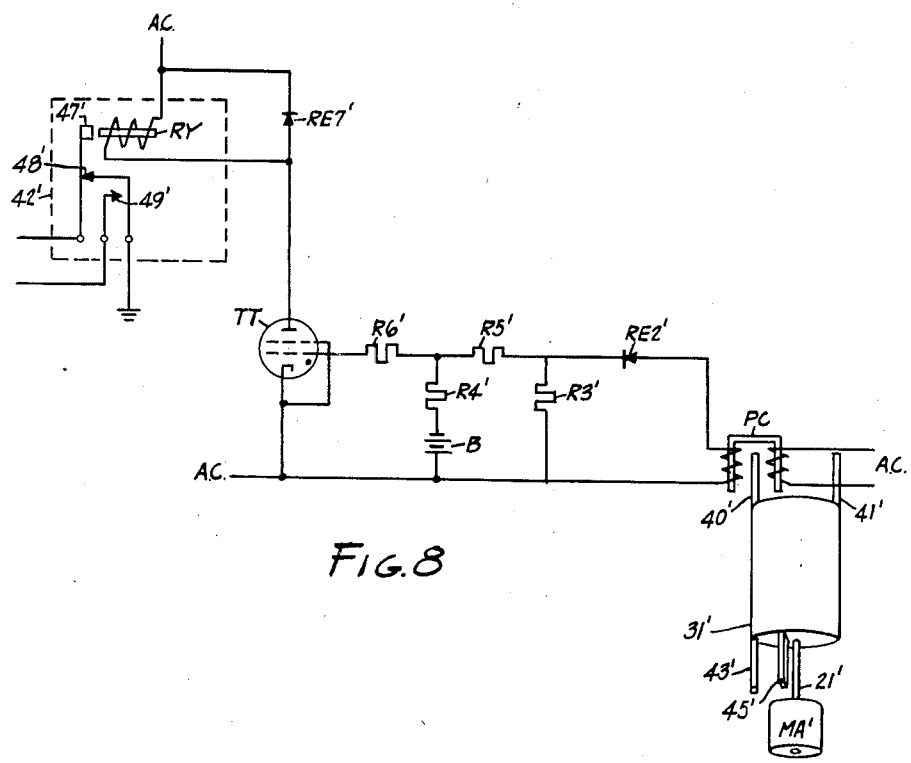
FIG. 8
LEW H. DIAMOND
JOHN H. McCONNELL } INVENTORS
HENRY B. BROWN
BY *J. L. Sharon* ATTORNEY July 4, 1961 L. H. DIAMOND ET AL 2,991,448
ELEVATOR ANNOUNCING SYSTEM
Filed March 28, 1956 8 Sheets-Sheet 7

LEW H. DIAMOND
JOHN H. McCONNELL } INVENTORS
HENRY B. BROWN

BY J. L. Sharon ATTORNEY

July 4, 1961   L. H. DIAMOND ET AL   2,991,448
ELEVATOR ANNOUNCING SYSTEM
Filed March 28, 1956   8 Sheets-Sheet 8

LEW H. DIAMOND
JOHN H. McCONNELL  } INVENTORS
HENRY B. BROWN
BY  ATTORNEY 2,991,448
ELEVATOR ANNOUNCING SYSTEM
Lew H. Diamond, Bethpage, N.Y., and John H. McConnell, Murray Hill, and Henry B. Brown, Madison, N.J., assignors to Otis Elevator Company, New York, N.Y., a corporation of New Jersey
Filed Mar. 28, 1956, Ser. No. 574,531
10 Claims. (Cl. 340—19)

This invention relates to announcing systems for elevators.

In modern plural elevator installations it is usual practice to employ a control system which coordinates and controls the operation of the elevator cars. The general object of the present invention is to provide a plural elevator installation with an announcing system which will operate in conjunction with any type of control system.

It is another object of this invention to provide an elevator announcing system which will reproduce a prerecorded message in an elevator car in response to the operation of that car.

It is a further object of this invention to provide for a plural elevator installation, an announcing system for reproducing a plurality of messages from a unitary message source to serve the complete elevator installation.

Another object of this invention is to provide an elevator announcing system for a plurality of elevator cars, wherein a single message source contains a variety of messages and pick-up means renders a plurality of messages constantly available for transmission, and means associated with each of the elevators selects a message to be reproduced in the selecting elevator.

Another object of this invention is to provide an announcing system for a plurality of elevators wherein a single message source contains a variety of messages relating to different conditions of the elevator cars and pick-up means render the variety of messages continuously available for transmission, indexing means controls said transmission, and selecting means responsive to the operation of a particular elevator operates the indexing means which gives certain messages a preference over other messages.

Another object of this invention is to provide a plural elevator installation with a unitary announcing device common to all the elevators so that any number of elevators can listen to the same message simultaneously or that any number of elevators can listen to different messages simultaneously.

Another object of this invention is to provide a plural elevator installation with a unitary announcing device common to all elevators and means responsive to the group operation of the elevators to select one elevator to listen to a particular message in preference to the other elevators.

Another object of this invention is to provide an announcing device for a plurality of elevators wherein messages of different durations are contained on a single message source and initiated by indexing means so that an announcement will only start at the beginning of a message.

Another object of this invention is to provide an elevator system with an announcing device, which will reproduce a variety of messages and wherein holding means permits a message to be completed without interruption, lock-out means prevents the repetition of certain messages and cycling means permits the repeat of certain other messages after a predetermined time delay.

In carrying out this invention a variety of messages relating to different operations of the elevator cars are prerecorded on a magnetic sleeve in such a manner that there is a separate message track on said sleeve for each message. The magnetic sleeve is fixed onto a drum which is rotatable at a constant speed by a driving motor and the time required for one revolution of the sleeve corresponds to the duration of a basic message. Messages of shorter duration than the basic message are prerecorded on the magnetic sleeve by utilizing only a portion of the circumference of a message track while messages of longer duration than the basic message are prerecorded by utilizing several of the message tracks in series.

A magnetic pick-up head is provided for each message to pick up that message from its message track and an amplifier for each pick-up head amplifies the message picked up thereby. With each magnetic pick-up head being in continuous engagement with its corresponding message track on the magnetic sleeve, each amplified message is constantly available for transmission to one or more elevator cars. The transmission of each amplified message is controlled by a message indexing relay and by providing a plurality of message indexing relays for each elevator car, the same or different messages may be transmitted simultaneously to different elevator cars. The message indexing relays of each car are prepared for operation by selecting relays for that car, which are actuated in response to the elevator control system.

The message indexing relays of each car are arranged in groups corresponding to groups of messages of different duration and a switch mechanism for each group controls the actuation of those message indexing relays in that group. Each switch mechanism is operated by separate timing means which are mounted on the rotating drum. The position of each timing means on the drum coincides with the point of the beginning of the messages on their message tracks so that the switch mechanisms actuate the message indexing relays only at the beginning of their corresponding messages.

When a message indexing relay or relays are energized by the make-before-break contacts of their respective switch mechanisms, they become self-holding through their own contacts. The timing means on the drum operates the make-before-break contacts so that the holding circuit is established before the energizing circuit is broken. Once an indexing relay has been energized, the circuit remains closed until the timing means on the drum rotates to a position to reoperate the make-before-break contacts so that the transmission of a message cannot be interrupted.

Lock-out relays are provided for certain of the message indexing relays to prevent their reenergization even though the elevator condition remains unchanged. But it is desirable to repeat certain other messages if the elevator condition remains unchanged for a predetermined period of time. To repeat these messages upon the expiration of such time, a cycling relay and a condenser in parallel therewith is energized by the operation of the certain other message indexing relays to prevent their reenergization until after the condenser has been discharged.

The messages are transmitted to a car by a common feed line and normally closed contacts of certain message indexing relays are placed in this common feed line so that a certain message is transmitted in preference to other messages. In the event the operation of the elevator car is such that more than one message indexing relay for that car is energized, only the preferred message will be transmitted to that car.

This announcing system may be utilized with any type of elevator control system, and while it is not limited to any particular elevator control system the invention will be described as applied to the system shown in U.S. Patent No. 2,682,318, granted June 29, 1954, to W. F. Glaser et al. The preferred application and further advantages of this invention will be understood from the following description when considered in connection with the accompanying drawings in which.

Figure 3:
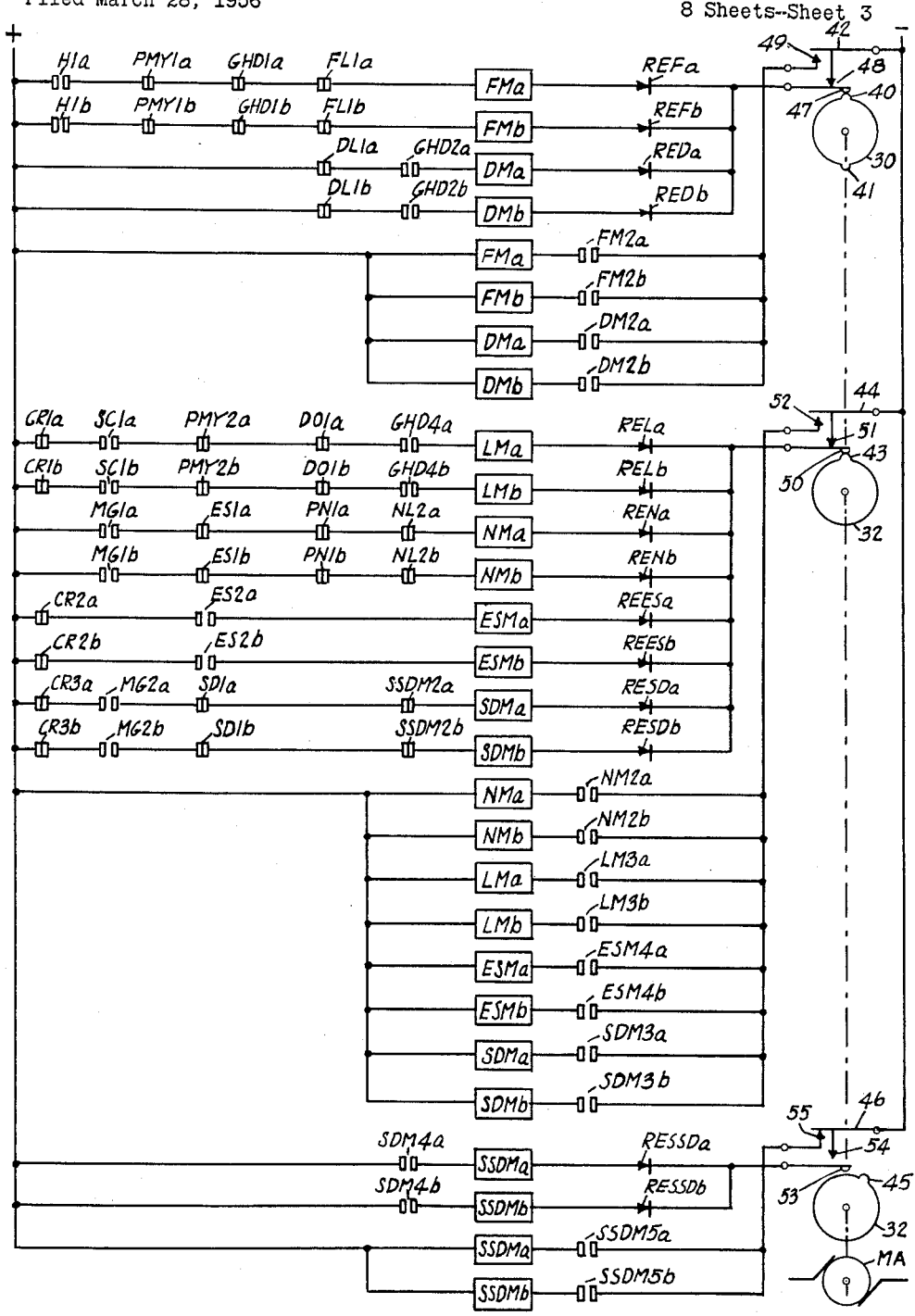
Figure 4:
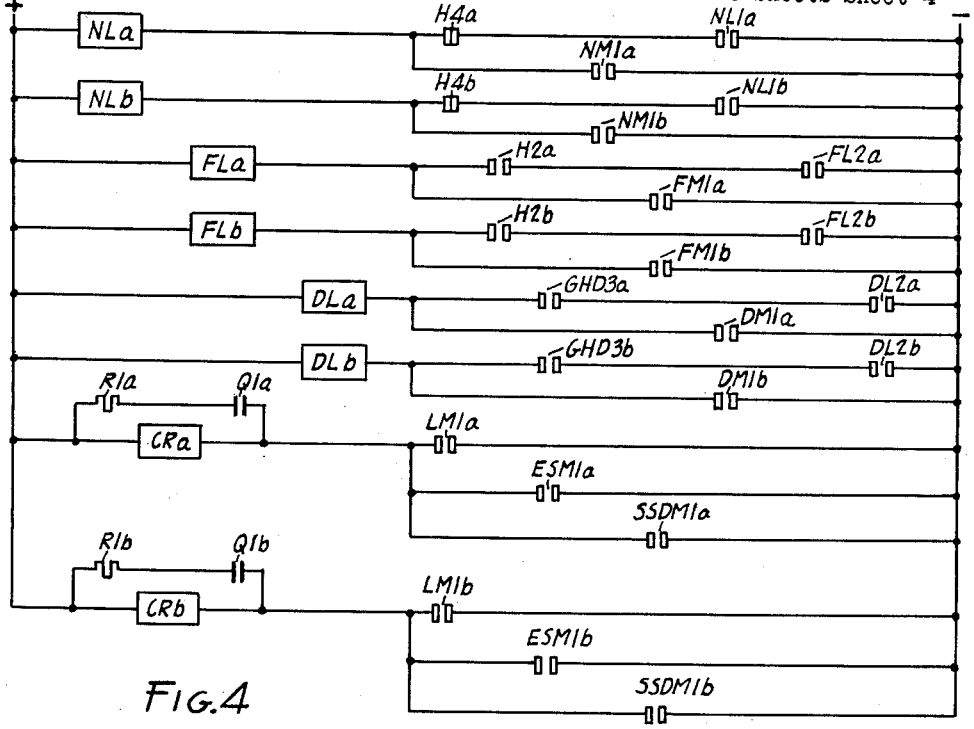
Figure 5:
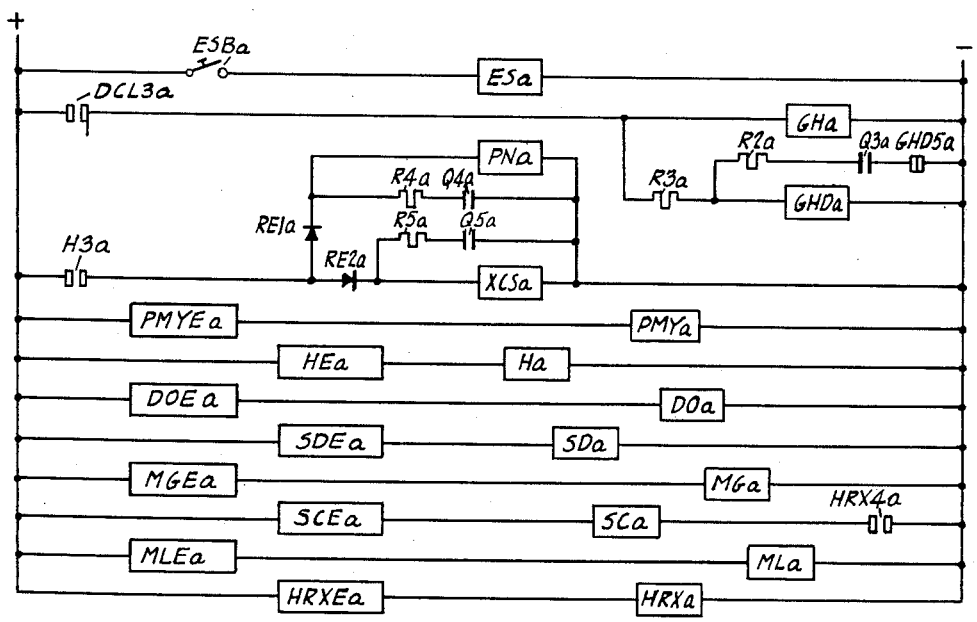
Figure 6:
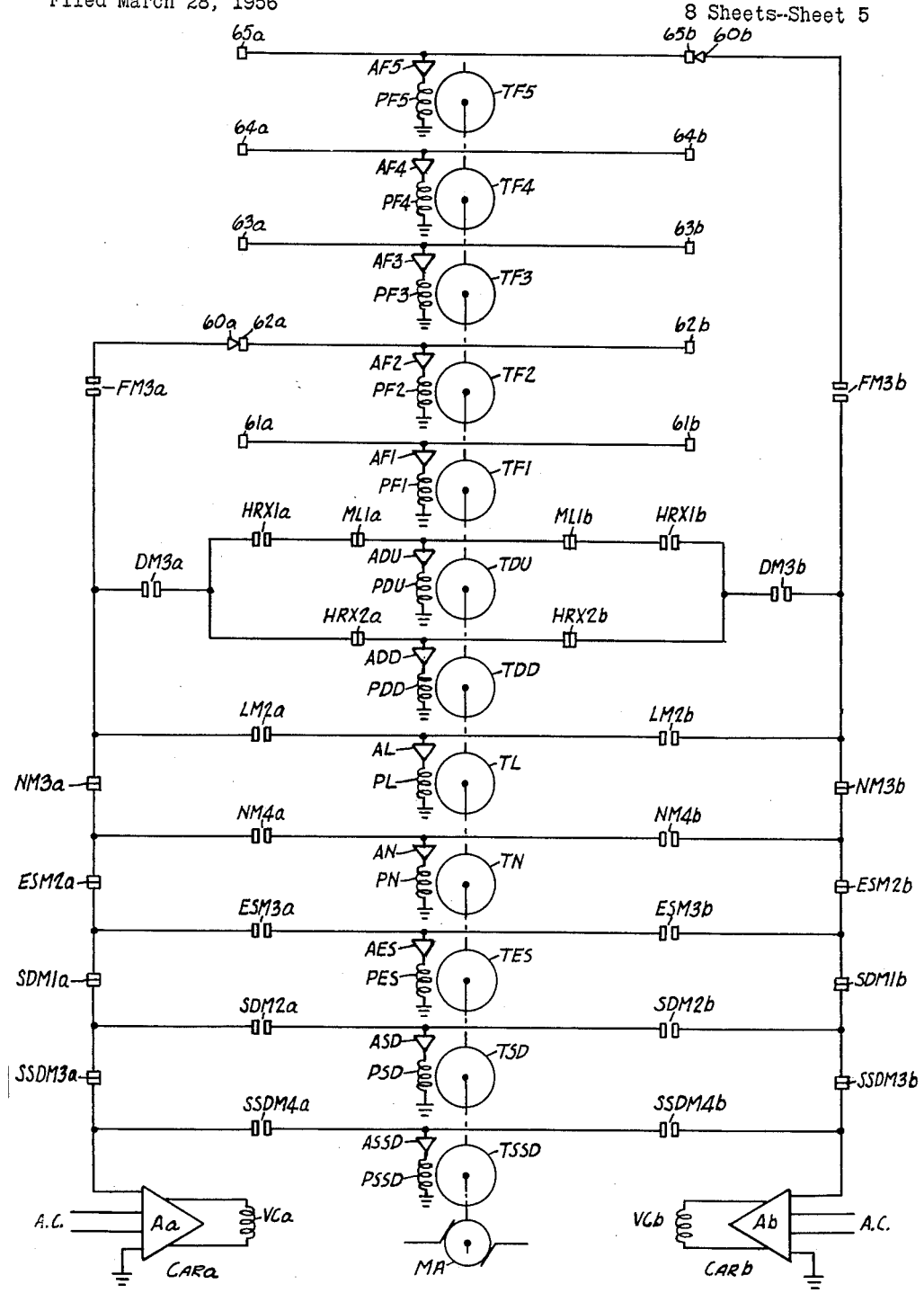
Figure 9A:
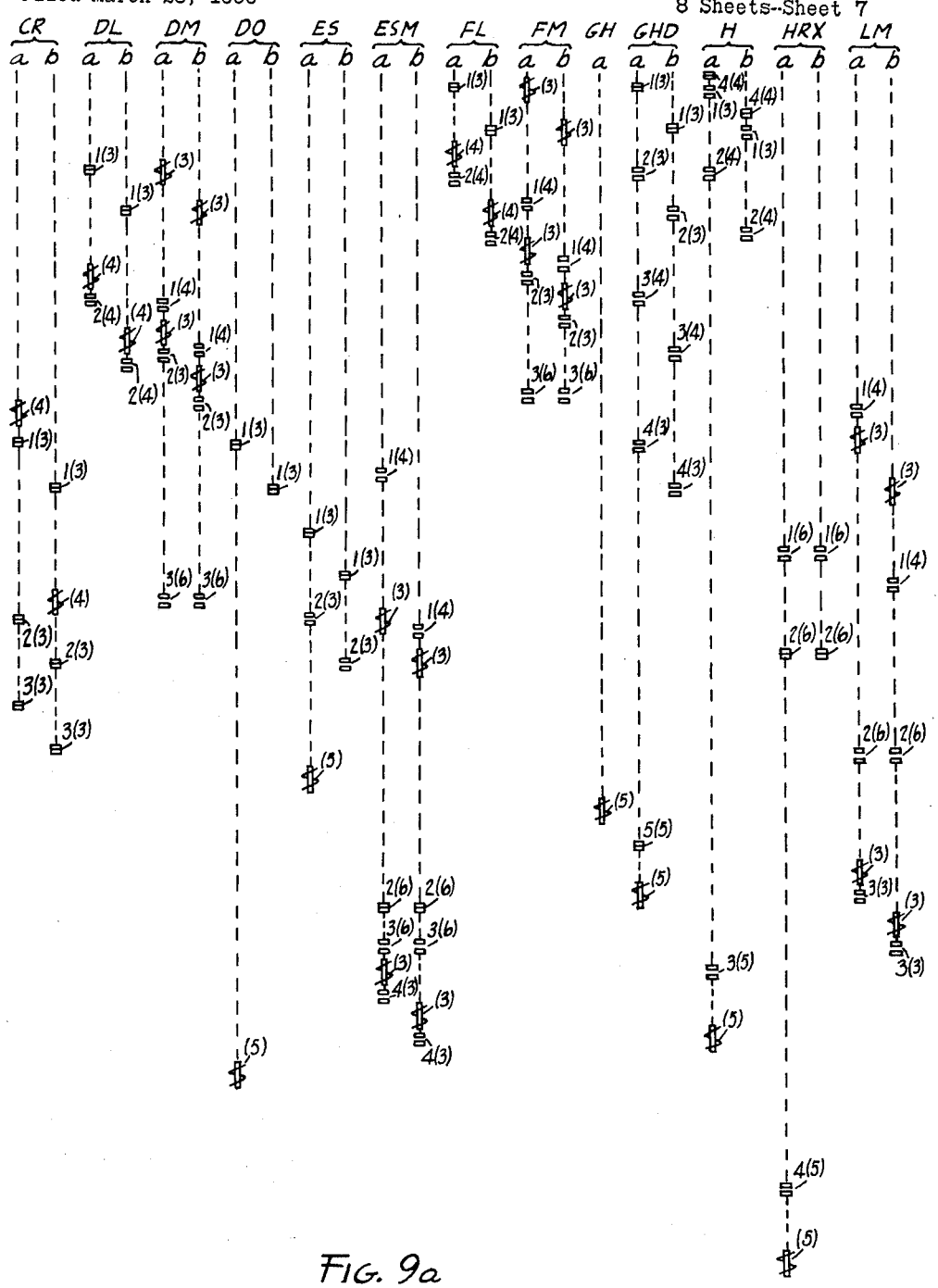
Figure 9B:
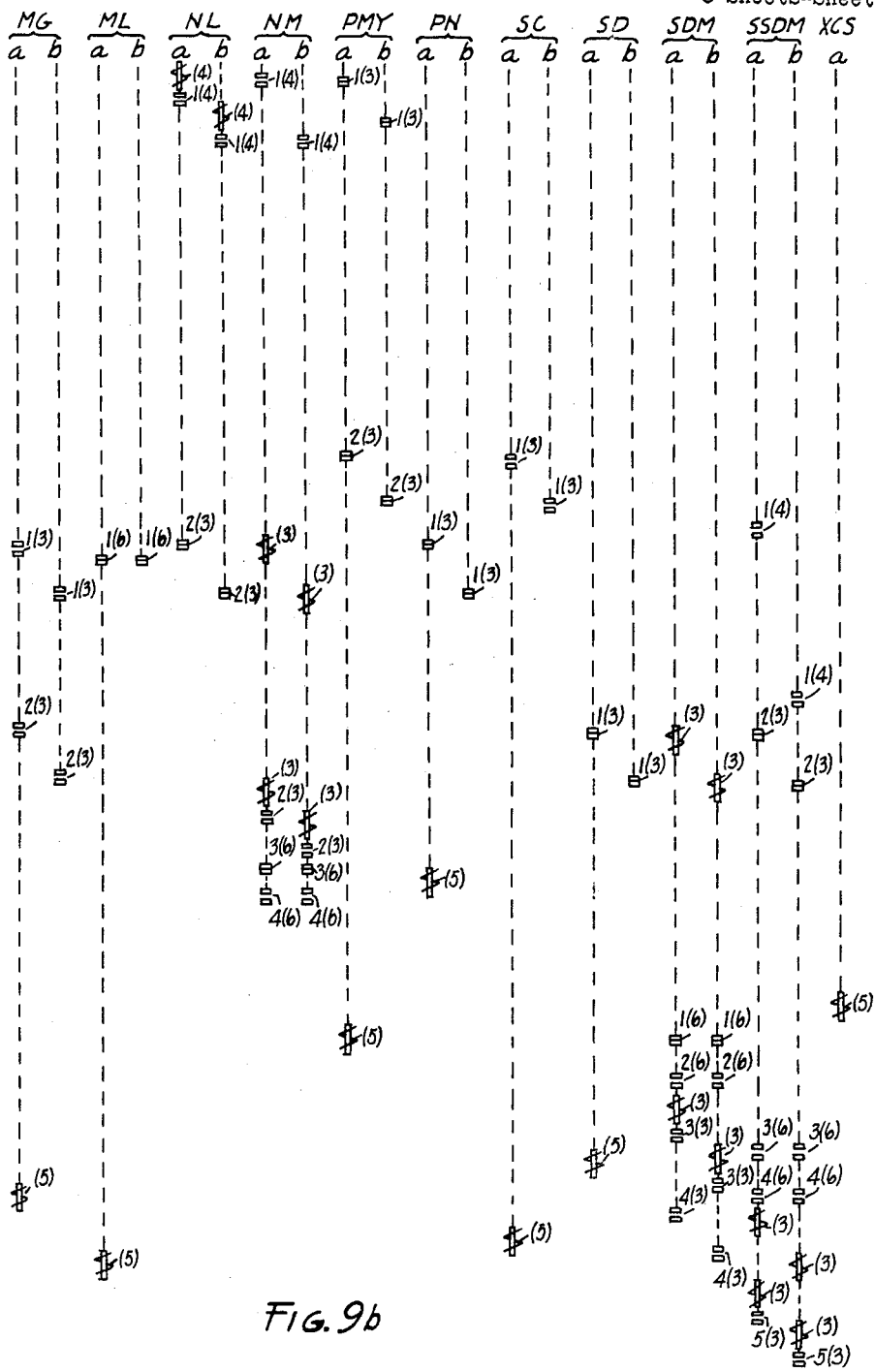

FIGURE 3 constitutes a simplified schematic wiring diagram of announcement initiating circuits for a two car installation;

FIGURE 4 is a simplified schematic wiring diagram for lock-out relays and cycling relays for a two car installation;

FIGURE 5 is a simplified schematic wiring diagram for selecting relay coils certain of which are contained in an elevator control system, as for example the system illustrated by the aforementioned Glaser et al. patent;

FIGURE 6 is a simplified schematic wiring diagram of the announcement circuits for a two car installation;

FIGURE 7 is a modification of a portion of the announcement initiating circuits shown in FIGURE 3;

FIGURE 7a is a key for FIGURE 7, showing the electromagnetic switches in spindle form;

FIGURE 8 is modification of a portion of FIGURE 3, in which an electronic circuit is utilized to actuate the switch mechanism;

FIGURES 9a and 9b are key sheets for FIGURES 3, 4, 5 and 6, showing the electromagnetic switches in spindle form.

Figure 1:
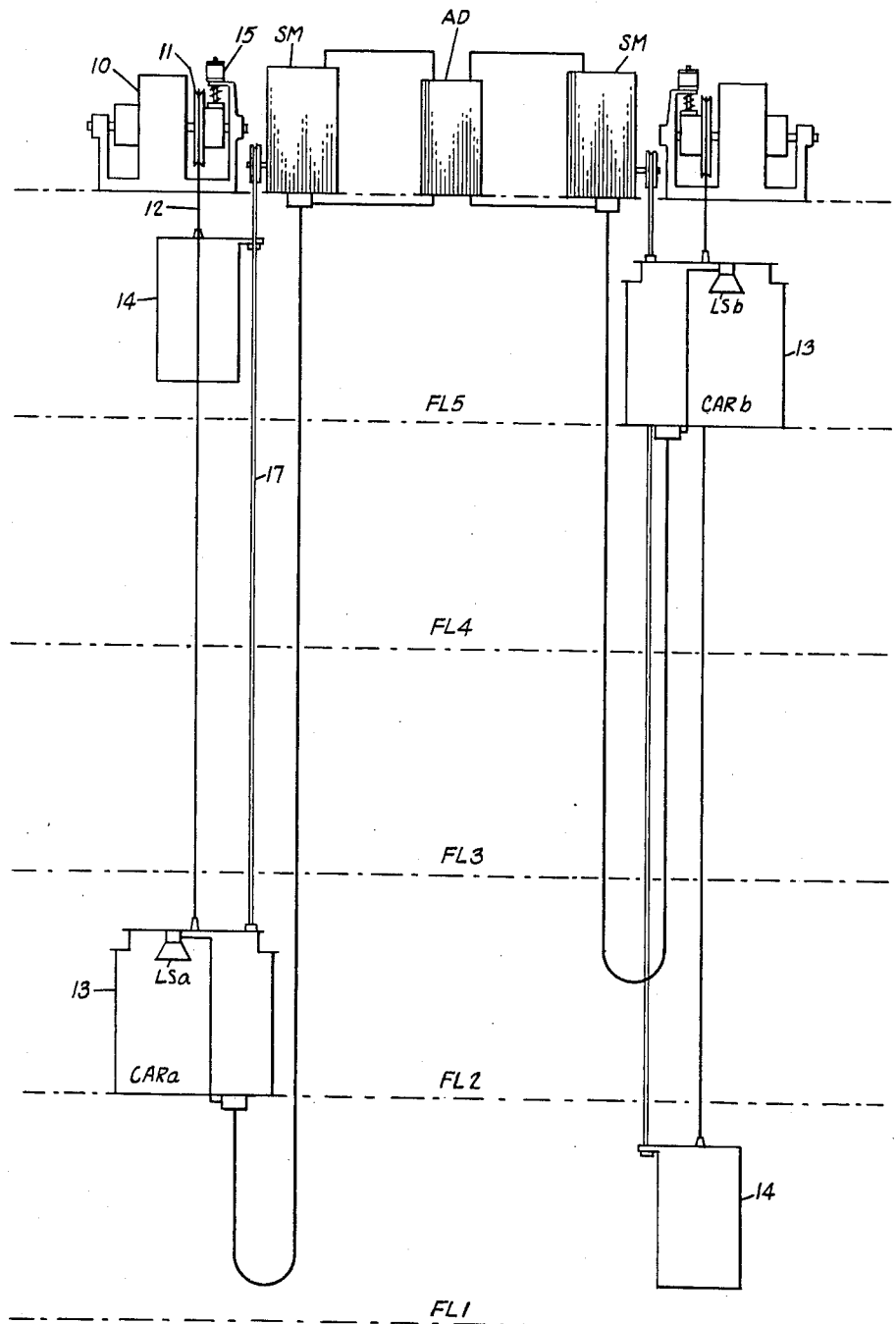
FIGURE 1 is a schematic diagram of an announcing system coordinated with an elevator installation illustrating relative positions of the cars, two cars being illustrated.

This announcing system may be coordinated with an elevator control system having any number of cars serving any number of floors but for the purpose of illustrating the invention in a simple form, it will be described as applied to a two car installation serving five floors. Such an arrangement is shown in FIGURE 1, wherein the floors are designated generally as FL and are differentiated by appended numbers. Each car is raised and lowered by means of a hoisting motor 10 which drives a traction sheave 11 over which pass hoisting ropes 12 for the car 13 and counterweight 14. An electromechanical brake 15 effects the final stopping operation and holds the car when at rest. A selector machine SM contains mechanism which is actuated in accordance with the movement of the car and which is utilized in the circuits for that car. The selector machine is driven by means of a steel tape 17 attached to the car and counterweight. Each selector machine is wired to the announcing device AD which in turn is connected to the loud speaker LS in each of the cars.

The electromagnetic switches shown on the drawings are designated as follows:

CR—Cycling relay
DL—Direction message lock-out relay
DM—Direction message indexing relay
DO—Door opening switch
ES—Emergency stop switch
ESM—Emergency stop message indexing relay
FL—Floor message lock-out relay
FM—Floor message indexing relay
GH—Door limit switch
GHD—Door limit time relay
H—Field and brake switch
HRX—Auxiliary highest call reversal switch
LM—Lobby message indexing relay
MG—Motor generator switch
ML—Main landing switch
NL—Nudging message lock-out relay
NM—Nudging message indexing relay
PMY—Pawl magnet switch
PN—Pre-nudging relay
SC—Selection switch
SD—Safety device switch
SDM—Safety device message indexing relay
SSDM—Supplementary safety device message indexing relay
XCS—Dispatching removal switch Throughout the description which follows, these reference letters will be applied to the coils of the above designated switches; with reference numerals appended thereto, they will be applied to the contacts of these switches; with the small case letters "a" and "b" appended thereto, they will differentiate between the two elevators "a" and "b."

Of the above electromagnetic switches, DO, H, HRX, MG, ML, PMY, SC, SD, are switches of the aforementioned Glaser et al. patent and the circuits for their coils are as illustrated in said patent. However, in order to present a complete circuit diagram for this invention, the coils of these switches are incorporated in the wiring diagram of FIGURE 5 wherein each of the above coils is in series with a rectangular block that designates the coil energizing means in said patent. Circuits for the switches GHD and PN are modified versions of the circuits for the switches GH and XCS of the Glaser et al. patent and the switches GH and XCS have been incorporated in FIGURE 5 to illustrate their relation to the switches GHD and PN respectively.

The electromagnetic switches are illustrated in deenergized condition. Each of the following switches has two coils, one a pull-in coil and the other a hold-in coil: FM, DM, LM, NM, ESM, SDM and SSDM.

The circuits are shown in "straight" form in which the coils and contacts of the various switches are separated in such a manner as to render the circuits as simple and direct as possible. The relationship of the coils and contacts may be seen from FIGURES 9a and 9b wherein the switches are arranged in alphabetical order with the coils and contacts of the various switches positioned on spindles. The relationship of each coil and its contacts to the wiring diagrams is shown by an appended number in brackets, which number indicates the particular figure of the drawing. Each coil and its contacts are positioned in vertical alignment on a spindle in such a manner as to indicate corresponding vertical locations on the drawings. For example, to locate the contacts DL1a, refer to spindle sheet 9a wherein the spindle for the electromagnetic switch DLa indicates that contacts 1 are to be found on FIGURE 3, a certain distance from the top of the drawing. The contacts may then be located on FIGURE 3 along a horizontal line which is spaced that particular distance from the top of the drawing.

Resistors are designated generally as R, rectifiers as RE, condensers as Q, amplifiers as A, magnetic play-back heads as P and sound tracks as T.

Figure 2:
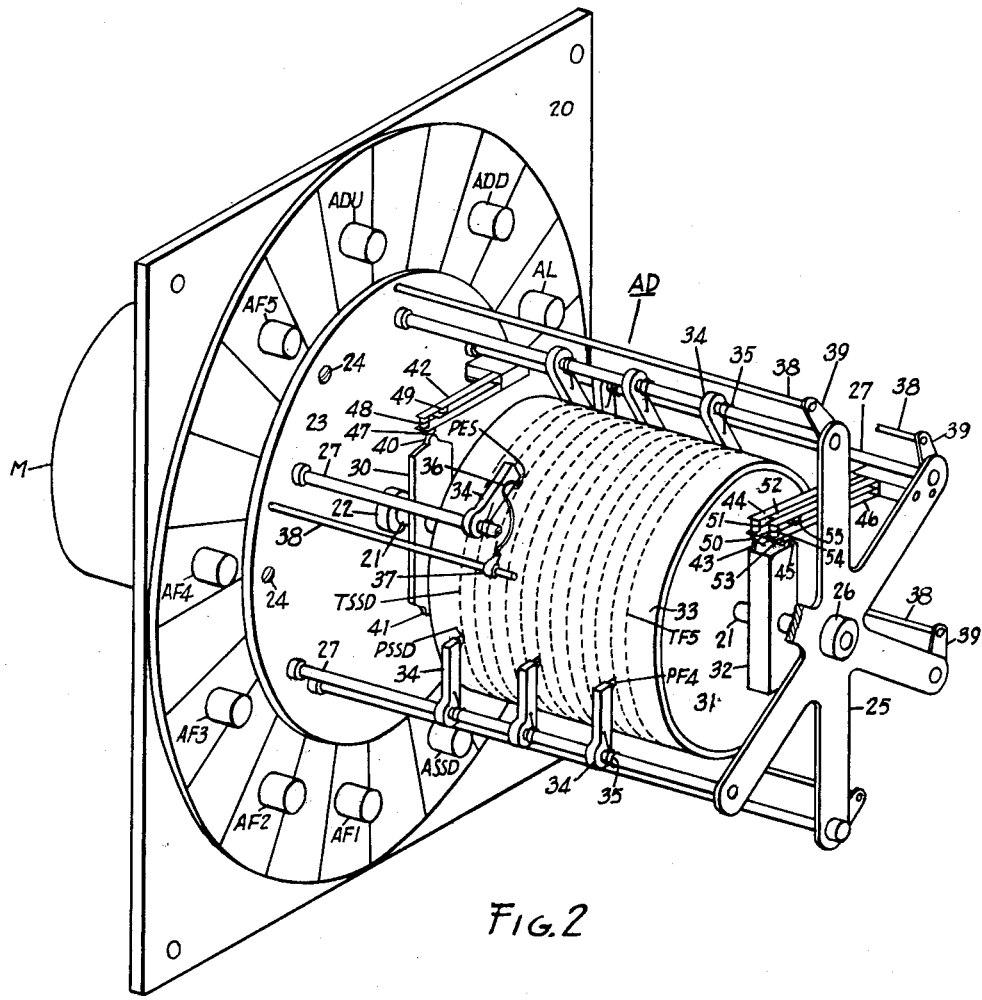
FIGURE 2 is a perspective view of the announcing device showing a magnetic sleeve mounted on a rotating drum.

Schematically represented in FIGURE 2 is a preferred form of an announcing device AD which comprises a mounting panel 20 that may be attached to a suitable cabinet frame (not shown). A driving motor M drives a shaft 21 the inner end of which is supported by a bearing 22 centrally positioned on a base 23. Any suitable fastening means, such as screws 24, may be utilized to attach the base 23 to the mounting panel 20. On the outer end of shaft 21, a spider plate 25 is supported by a bearing (not shown) and is held in position by fastening means 26. Each radial extremity of the spider plate 25 is connected to the base 23 by means of a rod 27. A rotor 30, a cylinder drum 31 and a second rotor 32 are mounted on the shaft 21 for rotation therewith for a purpose to be described hereinafter.

A magnetic sleeve 33 is secured to the drum 31 and upon this sleeve are recorded the messages to be reproduced. A variety of magnetically recorded messages are indicated around the sleeve in dashed lines, TF5, TSSD, etc., which represent message tracks. There is a magnetic pick-up head, PES, PSSD, etc., for each message track. Each pick-up head is supported by an arm, designated generally as 34, on a rod 27, and a coil spring 35, one for each arm 34, maintains proper tension on the arm 34 so that the magnetic pick-up head will be in continuous engagement with its corresponding sound track. The output of each magnetic pick-up head PES, etc., is connected to its corresponding pre-amplifier AES, etc., by means of wire 36 and terminal post 37 on a terminal rod 38. The terminal rod may be of any suitable type whereby connecting wires (not shown) lead from each pre-amplifier, AES, etc., through the terminal rod 38 to its corresponding terminal post 37. There is a terminal rod 38 supported on each rod 27 by means of a bracket 39, and each terminal rod has a number of terminal posts thereon corresponding to the number of pick-up heads supported on the adjacent rod 27.

Switch mechanism 42 is actuated twice for every revolution of the rotor 30 by the rotor cams 40 and 41. Similarly switch mechanisms 44 and 46 are each actuated once for every revolution of the rotor 32 by the rotor cams 43 and 45 respectively. The switch mechanisms 42, 44 and 46 are similar in construction and each comprises make-before-break contacts to close the holding circuit of a relay before opening the energizing circuit of that relay. When the cam 40 on rotor 30 engages the cam follower 47, normally open contacts 48 are engaged before normally closed contacts 49 are broken and when the cam 40 disengages the cam follower 47, contacts 49 are engaged before contacts 48 are broken. Similarly, cam 43 on rotor 32 engages cam follower 50 to actuate contacts 51 and 52, while cam 45 on rotor 32 engages cam follower 53 to actuate contacts 54 and 55.

Separate operations of the switch mechanisms 42, 44 and 46 provide means for utilizing messages of different time durations. As is shown in FIGURE 3, the announcement initiating circuits are divided into groups in accordance with the durations of their corresponding messages. For instance, switch mechanism 42 completes the circuits to reproduce messages of a short duration, switch mechanism 44 completes the circuits to reproduce messages of an intermediate duration and switch mechanism 46 completes the circuits to reproduce messages of a long duration. The duration of the various messages may be predetermined according to particular requirements and in one installation it was found satisfactory to use messages having a duration of one and one-half seconds, three seconds and six seconds.

The message indexing relays are arranged vertically on FIGURE 3 with the pull-in coil of each relay FMa, FMb, etc., bearing the same designation as the hold-in coil of that relay FMa, FMb, etc. The pull-in coil of each relay appears in the uppermost location while the hold-in coil of that relay appears in the lowermost location.

The operation of elevator a automatically prepares a circuit for the FMa relay (FIGURE 3) and to assure that the message will be given at its beginning, the circuit is not completed until the cam 40 actuates the switch mechanism 42. As cam 40 or cam 41 moves the cam follower 47, the normally opened contacts 48 are engaged to complete a circuit for the pull-in coil FMa. Energization of the pull-in coil FMa closes contacts FM2a to prepare a circuit for the hold-in coil FMa. As the cam 40 or cam 41 rotates past the cam follower 47, the normally closed contacts 49 are engaged to complete a circuit for the hold-in coil FMa. Inasmuch as contacts 49 are made before contacts 48 are opened, the circuit for the hold-in coil FMa is completed before the circuit for the pull-in coil FMa is opened.

In addition to the message indexing relay FMa, the message indexing relays FMb, DMa, DMb are also operated by the one and one-half second cams 40 and 41. Between each message indexing relay and its corresponding switch mechanism, a rectifier, generally designated RE, is placed in series with the pull-in coil to block the energization of other pull-in coils in response to the electric current from a circuit of an energized indexing relay.

The message indexing relays LM, NM, ESM and SDM are the announcement initiating circuits of the second group corresponding to the messages of intermediate durations. This group of relays is operated by switch mechanism 44 which is actuated by the three second cam 43 in the same manner as described above for the floor message indexing relay FMa.

The third group of announcement initiating circuits includes the supplementary safety device message indexing relay SSDM, which circuits are completed by switch mechanism 46 that is actuated by the six second cam 45. Cam 45 is in a radially advanced position relative to cams 40, 41 and 43 to assure the actuation of switch mechanism 46 just before the actuation of switch mechanism 44 by its cam 43.

In FIGURE 4 are shown circuits for lock-out relays and cycling relays. When the floor message indexing relay FMa is energized contacts FM1a are closed to complete a circuit for the floor lock-out relay FLa which is then self-holding through contacts FL2a and H2a. Energization of floor lock-out relay FLa opens contacts FL1a in series with the floor message indexing relay FMa, so that relay FMa cannot be energized repeatedly even though the call conditions still exist. Lock-out relays NL and DL operate in a similar manner as the floor lock-out relay FL.

Upon energization of one of the message indexing relays LMa, ESMa or SSDMa, a circuit is completed for the cycling relay CRa. Energization of cycling relay CRa opens the contacts CR1a, CR2a and CR3a in the announcement initiating circuits to prevent the reenergization of the message indexing relays LMa, ESMa and SDMa respectively even though the call conditions still exist. A resistor R1a and a condenser Q1a is in parallel with the cycling relay CRa to maintain the cycling relay CRa in its energized condition for a predetermined time after the circuit has been opened. Upon the operation of this predetermined time the cycling relay CRa drops out and contacts CR1a, CR2a and CR3a in the announcement initiating circuits are engaged so that the message indexing relays LMa, ESMa and SDMa, respectively, may be reenergized if the call conditions are still in existence. The cycling relay CRb is related to elevator car b and operates in the same manner as just described for the cycling relay CRa.

Shown in FIGURE 5 are the circuits for the coils of the selecting relays which are utilized to prepare the various message indexing relays for operation. While various elevator operations may be used to prepare the message indexing relays for operation, certain operations have been chosen from the control system disclosed in the Glaser et al. patent. Inasmuch as the energizing means for certain of the selecting relays may be found in said patent, such energizing means are not incorporated herewith but rather are merely indicated by a rectangular block. It may be ascertained from said patent that the field and brake switch Ha is energized when car a is running, and this condition corresponds to the energizing means within the rectangular block HEa which completes a circuit to energize the selecting relay Ha in FIGURE 5. Energization of the selecting relay Ha engages contacts H1a in FIGURE 3 to establish one of the conditions necessary to prepare the floor message indexing relay for operation. Selecting relays PMYa, DOa, SDa, MGa, SCa, MLa and HRXa are energized in a similar manner as just described for selecting relay Ha.

While electromagnetic switches GH and XCS may also be found in said patent, the circuits for their coils have been reproduced in FIGURE 5 to illustrate their relation to the completed circuits for the selecting relays GHD and PN respectively. The door close limit switch DCL3a is a normally open mechanical switch that is actuated when the elevator doors have moved a small distance from their fully closed position. Closing of switch DCL3a completes a circuit for the door limit switch GHa and for the door limit time relay GHD*a* as is shown in FIGURE 5. To delay the energization of the selecting relay GHD*a*, a resistor R3*a* is inserted in series therewith and a condenser Q3*a* is placed in parallel with said relay GHD*a*. After the expiration of the predetermined time, selecting relay GHD*a* is energized, contacts GHD2*a* are closed and the circuit for the direction message indexing relay DM*a* is established. Normally closed contacts GHD1*a* are placed in the circuit for message indexing relay FM*a* to serve as a lock-out for relay FM*a* when relay DM*a* is energized. The normally closed contacts GHD5*a* are placed in series with the condenser Q3*a* so that discharge of the condenser cannot reenergize the relay GHD*a*.

As described in the Glaser et al. patent, the dispatching removal relay XCS is delayed from dropping out by the use of the condenser Q5*a*. The selecting relay PN*a* is also delayed in dropping out but here the delay is shorter than that used for relay XCS*a* so that the nudging message indexing relay will be energized shortly before the nudging operation commences. A condenser Q4*a* is placed in parallel with PN*a* to assure this shorter time delay and rectifiers RE1*a* and RE2*a* are used to prevent the discharge of condensers Q4*a* and Q5*a* from energizing the relays PN*a* and XCS*a* respectively.

When the emergency stop button switch is manually pushed, a circuit for the selecting relay is established as is shown in FIGURE 5 and renders the selecting relay ES*a* energized, whereupon contacts ES2*a* are closed and a circuit for the emergency stop message indexing relay ESM*a* is established. Normally closed contacts ES1*a* are placed in the circuit for message indexing relay NM*a* to serve as a lock-out for relay NM*a* when relay ESM*a* is energized.

The circuits shown in FIGURE 5 and the above description thereof have been applied to elevator car *a* and since the same circuits for car *b* are identical, they have not been shown.

It is seen from the announcement circuits in FIGURE 6 that each magnetic pick-up head P picks up a message from its corresponding message track T and an amplifier for each pick-up head amplifies the message picked up thereby. The motor armature MA rotates the message tracks T at a constant speed and with each pick-up head being in continuous engagement with its corresponding message track, each message is available for transmission to car *a* and car *b*. When a message indexing relay for a particular car is energized, the associated pre-amplified message is transmitted through a power amplifier A, which is powered from a source of alternating current, to a voice coil VC for reproduction in that car.

The transmissions of all the amplified floor messages to a particular car are controlled by the floor message indexing relay FM for that car and selecting means is utilized to determine which one of the floor messages is to be transmitted. As is shown in FIGURE 6, the elevator selector machine includes a traveling brush 60 to engage successively contacts 61 through 65 which correspond to the five floors to be served in this particular installation. The movement of the brush 60 is in advance of the movement of the elevator car so that the brush 60 engages a floor contact before the elevator car actually reaches that floor and if the elevator control system indicates that the elevator car is to stop at a particular floor, the brush 60 ceases its advanced travel and engages the contact for that particular floor. If the use of the selector machine's brush and floor contacts in the announcement circuits results in a noise level that is unfavorable, such a condition may be corrected by utilizing the selector machine to control ancillary selecting apparatus, such as relays or a stepping switch, which are placed in the announcement circuits.

Contacts DM3*a* from the direction message indexing relay DM are utilized in FIGURE 6 to complete the announcement circuit for both the up direction message track TDU and for the down direction message track TDD. The announcement circuit for a direction message must also be established by circuitry from the elevator control system; for instance, contacts HRX1, HRX2 and ML1 are taken from the elevator control system and the conditions necessary to operate these contacts may be found in the Glaser et al. patent.

The announcement circuits for the remaining message tracks TL, TN, TES, TSD and TSSD in FIGURE 6 are each completed by the energization of their respective message indexing relay to transmit their corresponding messages to the voice coil VC.

Each announcement circuit is connected to the power amplifier A by a common feed line, and normally closed contacts in the common feed line, which are opened upon energization of certain message indexing relays permit a preferential arrangement of the messages. It can be seen from FIGURE 6 that energization of the message indexing relays NM, ESM, SDM and SSDM opens their contacts NM3, ESM2, SDM1 and SSDM3, respectively, in the common feed lines for each elevator so that a preference in transmission of their corresponding messages is given in reverse descending order. For instance, energization of the nudging message indexing relay for a particular elevator car opens the contacts NM3 in the common feed line for that elevator car so that transmission of a message from any of the message tracks TL, TDD, TDU or TF1 through TF5 is prevented but the contacts NM3 would not prevent transmission from any of the message tracks TES, TSD or TSSD.

Next to be described is a sequence of operation whereby each elevator calls for a particular message in response to a particular operation of the elevator. It is to be understood that the message indexing relays may be made responsive to any number and variety of elevator operations and those described herein are set forth merely as one example of certain elevator operations.

Assume that car *a* is traveling upward to stop at the second floor in response to a registered call in the elevator control system and it is desired to reproduce a message in car *a* as it approaches the second floor. When the car is moving, the elevator control system performs the functions indicated by the rectangular block HE*a*, completing a circuit for the coil of the field and brake switch H*a*. Operation of this switch engages contacts H1*a* in the circuit for the floor message indexing relay FM*a*. In the selector machine, a pawl magnet switch is energized when a car starts on its run and is deenergized to initiate the slow-down of the car as it approaches the floor for which a call has been registered. At this point of slow-down the coil PMY*a* is deenergized and the breaking contacts PMY1*a* are engaged. The selector machine also contains the traveling brush 60*a* which stops on contact 62*a* since a call has been registered for the second floor. Since the door close switch DCL3*a* is opened whenever the elevator doors are closed, the contacts GHD1*a* are closed. Breaking contacts FL1*a* are lock-out contacts which are opened after the floor message indexing relay is energized to prevent the message from being repeated when the conditions for energizing FM*a* remain the same. The engagement of each of the above contacts prepares a circuit for the floor message indexing relay FM*a* in FIGURE 3 and when one of the timing cams 40 or 41 actuates the switch mechanism 42, the circuit is completed from the plus feed line through contacts H1*a*, PMY1*a*, GHD1*a*, FL1*a*, pull-in coil FM*a*, rectifier REF*a* and contacts 48 in the switch mechanism 42 to the ground line. Contacts FM3*a* on FIGURE 6 are now closed and the announcement circuit is completed from the magnetic pick-up head PF2, through pre-amplifier AF2, contact 62*a*, brush 60*a*, contacts FM3*a*, NM3*a*, ESM2*a*, SDM1*a*, SSDM3*a* and the signal input of power amplifier A*a* to ground. The signal output of the power amplifier A*a* excites the voice coil VC*a* and the message "2nd floor" is now reproduced by the loud speaker LS*a* in elevator car *a*.

As the timing cam rotates past the cam follower 47 in the switch mechanism 42, the circuit for the hold-in coil of indexing relay FMa is made before the circuit for the pull-in coil of relay FMa is broken. The holding circuit is from the plus feed line through the hold-in coil FMa, contacts FM2a and contacts 49 in the switch mechanism 42 to the ground line.

When the floor message indexing relay FMa is energized, its contacts FM1a are closed to complete a circuit for the lock-out relay FLa which is self holding through contacts H2a and FL2a. As the timing cam 40 or 41 again engages the cam follower 47 in the switch mechanism 42 and the conditions which were responsible for the original energization of the pull-in coil FMa remain unchanged, the floor message indexing relay FMa will not be reenergized because the breaking contacts FL1a are still opened.

While the elevator doors are in the process of opening it is desired to reproduce a message indicating the direction of travel of the elevator, for example, "going up" or "going down." Like the floor message this is a one and one-half second message and the elevator control system will determine which direction message is to be reproduced. Making contacts HRX1a and breaking contacts ML1a are placed in the up direction announcement circuit while breaking contacts HRX2a are placed in the down direction announcement circuit. The conditions necessary to actuate the energization means in the rectangular blocks HRXEa and MLEa may be found in the Glaser et al. patent. Actuation of HRXEa completes a circuit for the coil HRXa, engaging contacts HRX1a in the up direction announcement circuit and opening contacts HRX2a in the down direction announcement circuit so that one direction message cannot interfere with the other direction message. The main landing switch contacts ML1a are utilized to prevent an up direction message from being reproduced at the first floor because a different message is to be given at the first floor as will be described hereinafter.

While the elevator doors are in the process of opening selecting relay GHDa is energized as described above. This prepares a circuit for the direction message indexing relay DMa in FIGURE 3 from the plus feed line through the lock-out relay contacts DL1a, contacts GHD2a, pull-in coil DMa and rectifier REDa to the switch mechanism 42, and upon actuation of switch mechanism 42 by one of the cams 40 or 41, this circuit will be completed through the contacts 48 in the switch mechanism 42 to the ground line. Contacts DM3a are now closed and the announcement circuit in FIGURE 6 is completed from the magnetic pick-up head PDU through the pre-amplifier ADU, contacts ML1a, HRX1a, DM3a, NM3a, ESM2a, SDM1a, SSDM3a and the signal input of power amplifier Aa to ground. The signal output of the power amplifier Aa excites the voice coil VCa and the message "going up" is now reproduced by the loud speaker LSa in elevator car a.

Both the direction lock-out relay DLa and the hold-in coil of the direction message indexing relay DMa are energized in the same manner as described above for the floor lock-out relay FLa and the floor message indexing relay FMa respectively.

Indexing relays FMa and DMa are energized in response to the one and one-half second cams so that the longest delay in reproducing a floor message or direction message would be some increment less than one and one-half seconds.

The same one and one-half second message is prerecorded on each half of the sound track T but two different one and one-half second messages may be prerecorded onto different halves of the same sound track T. This has the desired effect of reproducing a three-second message with only a reproduction delay attributed to a one and one-half second message. In such an arrangement a three-second message is divided into two parts and is so worded that either part may be given first without destroying the meaning of the message. When applied to a department store elevator, a floor message would announce the merchandise on that floor as well as the floor number, for example, "second floor; sporting goods," or "sporting goods; second floor."

Assume now that car b is at the first floor with its doors opened and it is desired to give an instruction message to the incoming passengers. In the event there is more than one car at the first floor the elevator control system will select a car to be dispatched and such selection means is designated by the rectangular block SCE. Actuation of the energizing means in the rectangular block SCEb will complete a circuit for the selecting relay coil SCb, closing contacts SC1b in the circuit for the lobby message indexing relay LMb in FIGURE 3. As mentioned above, selecting relay PMYb is not energized until car b starts its run, so with the car at the lobby, break contacts PMY2b remain engaged. A circuit for the selecting relay DOb is completed by the rectangular block DOEb only when the elevator doors are in the process of opening, so with the doors already opened to receive passengers selecting relay DOb has dropped out and break contacts DO1b remain engaged. Selecting relay GHDb is energized while the doors are being opened and remains energized until a short interval after the doors are closed. With the doors already opened the selecting relay GHDb is energized and the contacts GHD4b are engaged. A circuit for the cycling relay CRb is not completed until any one of the message indexing relays LMb, ESMb or SDDMb are energized so with cycling relay CRb deenergized, break contacts CR1b remain engaged. The engagement of each of the above contacts prepares a circuit for the lobby message indexing relay LMb and when the three-second cam 43 actuates the cam follower 50 in the switch mechanism 44 the circuit is completed from the plus feed line through contacts CR1b, SC1b, PMY2b, DO1b, GHD4b, pull-in coil LMb, rectifier RELb and contacts 51 in the switch mechanism 44 to the ground line. Contacts LM2b on FIGURE 6 are now closed and the announcement circuit is completed from the magnetic pick-up head PL, through the pre-amplifier AL, contacts LM2b, NM3b, ESM2b, SDM1b, SSDM3b and the signal input of power amplifier Ab to ground. The signal output of the power amplifier Ab excites the voice coil VCb and the message "please push your floor button and step back" is now reproduced by the loud speaker LSb in the elevator car b.

The hold-in coil of the lobby message indexing relay LMb is energized in the same manner as described above for indexing relay FMa.

Energization of the lobby message indexing relay LMb engages contacts LM1b to complete a circuit for the cycling relay CRb in FIGURE 4. This opens the break contacts CR1b in the circuit for the indexing relay LMb so that the message cannot be repeated when the cam 43 again actuates switch mechanism 44. Once the lobby message has been reproduced, indexing relay LMb is denergized and contacts LM1b are opened but the condenser Q1b maintains the cycling relay CRb in its energized state for a predetermined time, as for example, eight seconds. After the expiration of the eight seconds the condenser Q1b has been discharged, dropping out the cycling relay CRb and break contacts CR1b are closed. Upon the expiration of one more second, the three-second cam 43 will actuate the switch mechanism 44, so if the conditions necessary to prepare a circuit for the lobby message indexing relay LMb are still in existence the lobby message will be repeated.

Assume that car a is at the second floor with its doors in the process of closing and the door closing operation is delayed by a passenger holding the safety shoe. After the closing operation has been delayed for a predetermined time interval, it is conventional practice for the door to be forcibly closed; this operation is known as nudging, and it is desired to reproduce a nudging message a short time before initiation of the nudging operation. As described above, the circuits in FIGURE 5 will de-energize the selecting relay PN$a$ a short time before the dispatching removal relay XCS$a$ is deenergized. Upon the expiration of this short interval, the condenser Q4$a$ is discharged, dropping out the selecting relay PN$a$ and its contacts PN1$a$ in the circuit for the nudging message indexing relay NM$a$ are engaged. Selecting relay MG$a$ is energized when the motor generator is running as indicated by the rectangular block MGE$a$ and contacts MG1$a$ are closed. Breaking contacts NL2$a$ are lock out contacts which remain engaged until the nudging message indexing relay NM$a$ is energized to prevent the message from being repeated. Breaking contracts ES1$a$ remain engaged as long as the emergency stop message indexing relay ESM$a$ is not energized and so there can be no interference between the nudging message and the emergency stop message. The engagement of each of the above contacts prepares a circuit for the nudging message indexing relay NM$a$ and when the three-second cam 43 actuates the switch mechanism 44 the circuit is completed from the plus feed line through contacts MG1$a$, ES1$a$, PN1$a$, NL2$a$, pull-in coil NM$a$, rectifier REN$a$ and contacts 51 in the switch mechanism 44 to the ground line. Contacts NM4$a$ are now closed and the announcement circuit is completed from the magnetic pick-up head PN through pre-amplifier AN, contacts NM4$a$, ESM2$a$, SDM1$a$, SSDM3$a$ and the signal input of power amplifier A$a$ to ground. The signal output of the power amplifier A$a$ excites the voice coil VC$a$ and the message "Release the doors; you are delaying service" is now reproduced by the loud speaker LS$a$ in the elevator car $a$. Breaking contacts NM3$a$ in the common feed line of the announcement circuits gives this message preference over the floor message, the direction message, and the lobby message.

Both the nudging lock-out relay NL$a$ and the hold-in coil of the nudging message indexing relay NM$a$ are energized in the same manner as described above for the floor lock-out relay FL$a$ and the floor message indexing relay FM$a$ respectively.

Assume that during the travel of the car a passenger pushes the emergency stop button ESB$a$ in car $a$ and it is desired to reproduce an instruction message in that car for the passengers. Pushing emergency stop button ESB$a$ completes a circuit for the selecting relay ES$a$, closing contacts ES2$a$ in the circuit for the emergency stop message indexing relay ESM$a$. With the cycling relay contacts CR2$a$ in their normally closed position, a circuit is prepared for the emergency stop message indexing relay ESM$a$ from the plus feed line through contacts CR2$a$, ES2$a$, pull-in coil ESM$a$, rectifier REES$a$, and when the three-second cam 43 actuates the cam follower 50 in the switch mechanism 44 the circuit is completed through the contacts 51 in the switch mechanism 44 to the ground line. Contacts ESM3$a$ are now closed and the announcement circuit is completed from the magnetic pick-up head PES through the pre-amplifier AES, contacts ESM3$a$, SDM1$a$, SSDM3$a$ and the signal input of power amplifier A$a$ to ground. The signal output of the power amplifier A$a$ excites the voice coil VC$a$ and the message "please reset the emergency stop button" is now reproduced by the loud speaker LS$a$ in the elevator car $a$. Breaking contacts ESM2$a$ in the common feed line of the announcement circuits gives this message preference over the floor message, the direction message, the lobby message, and the nudging message.

The hold-in coil of the emergency stop message indexing relay ESM$a$ is energized in the same manner as described above for the floor message indexing relay FM$a$.

The emergency stop message indexing relay ESM$a$ is also subject to cycling relay CR$a$ in a similar manner as described above for the lobby message indexing relay LM$b$ so that the message will be repeated after expiration of nine seconds if the emergency stop button ESB$a$ remains closed.

An instruction message to be given in response to the actuation of one of the elevator safety devices is divided into two portions, each of which has a three-second duration. The first portion of this instruction message is given in response to actuation of the safety device message indexing relay SDM, while the second portion of this instruction message is given in response to the actuation of the supplementary safety device message indexing relay SSDM.

If, during the travel of elevator car $a$, one of the automatic safety devices is actuated to stop the elevator, it is desired to reproduce an instruction message for the passengers in the elevator. Actuation of the safety device means in the rectangular block SDE$a$ will open the circuit for the selecting relay SD$a$. When the selecting relay SD$a$ drops out, its contacts SD1$a$ are engaged in the circuit for the safety device message indexing relay SDM$a$. As mentioned above, when the motor generator set is running, the selecting relay MG$a$ is energized and contacts MG2$a$ are engaged. Breaking contacts SSDM2$a$ in this circuit prevent interference of the safety device message with the supplementary safety device message. Cycling relay contacts CR3$a$ are engaged, since the cycling relay CR$a$ has not been energized. The engagement of each of the above contacts prepares a circuit for the emergency stop message indexing relay SDM$a$ from the plus feed line through contacts CR3$a$, MG2$a$, SD1$a$, SSDM2$a$, pull-in coil SDM$a$, rectifier RESD$a$, and the circuit is completed through the contacts 51 in the switch mechanism 44 to the ground line when the three-second cam 43 actuates the cam follower 50 in the switch mechanism 44. Contacts SDM2$a$ are now closed and the announcement circuit is completed from the magnetic pick-up head PSD, through the pre-amplifier ASD, contacts SDM2$a$, SSDM3$a$ and the signal input of power amplifier A$a$ to ground. The signal output of the power amplifier A$a$ excites the voice coil VC$a$ and the message "A safety device has stopped the car" is now reproduced by the loud speaker LS$a$ in the elevator car. Breaking contacts SDM1$a$ in the common feed line of the announcement circuits are opened to give this message preference over the floor message, the direction message, the lobby message, the nudging message and the emergency stop message.

The hold-in coil of the safety device message indexing relay SDM$a$ is energized in the same manner as described above for the floor message indexing relay FM$a$.

Energization of the indexing relay SDM$a$ closes contacts SDM4$a$ to prepare a circuit for the supplementary safety device message indexing relay SSDM$a$ in FIGURE 3, but the circuit is not completed until the six-second cam 45 actuates the cam follower 53 in the switch mechanism 46. Since the six-second cam 45 is advanced radially in relation to the three-second cam 43, switch mechanism 46 is actuated after the three-second cam 43 actuates the switch mechanism 44, and a circuit is completed from the plus feed line through contacts SDM4$a$, pull-in coil SSDM$a$, rectifier RESSD$a$, contacts 54 in the switch mechanism 46 to the ground line. Contacts SSDM4$a$ are now closed and the announcement circuit is completed from the magnetic pick-up head PSSD through the preamplifier ASSD, contacts SSDM4$a$ and the signal input of power amplifier A$a$ to ground. The signal output of the power amplifier A$a$ excites the voice coil VC$a$ and the second portion of this instruction message "the superintendent has been notified" is now reproduced by the loud speaker LS$a$ in the elevator car $a$. Just after the cam 45 is rotated past the cam follower 53 in the switch mechanism 46, the cam 43 engages the cam follower 50 in the switch mechanism 44 which breaks contacts 52 to open the circuit for the hold-in coil SDM$a$. This operation serves as a lock-out to prevent the reenergization of the pull-in coil SSDMa by opening contacts SDM4a.

The hold-in coil of the supplementary safety device message indexing relay SSDMa is energized in the same manner as described above for the floor message indexing relay FMa.

A circuit for the cycling relay CRa in FIGURE 4 is completed by the engagement of contacts SSDM1a, but it is more desirable to cycle the first portion of the safety device message in order to maintain a nine-second interval before the first portion of this message will be repeated so the contacts CR3a are placed in the circuit for the pull-in coil SDMa.

A modification is illustrated in FIGURE 7 whereby the second portion of a six second message is initiated by the same timing cam which initiates the first portion of the message. The circuitry shown in FIGURE 7 and the following description thereof have been applied to elevator car a and since the corresponding circuits for car b are similar, they have not been shown. Operation of one of the safety devices in the rectangular block SDEa will open the circuit for the selecting relay SDa. When the selecting relay SDa drops out, its contacts SD1a are engaged in the circuit for the safety device message indexing relay SDMa. Since the cycling relay CRa has not been energized, its contacts CR1a are engaged. Breaking contacts SSDM1a are also engaged because the message indexing relay SSDMa has not been energized. The engagement of each of the above contacts prepares a circuit for the safety device message indexing relay SDMa and when the three second cam 43 actuates the cam follower 50 in the switch mechanism 44, a circuit is completed from the plus feed line through contacts CR1a, SD1a, SSDM1a, pull-in coil SDMa, rectifier RESDa and contacts 51 in the switch mechanism 44 to the ground line. Energization of the safety device message indexing relay SDMa permits the announcement circuit to be completed as described previously and the first portion of this six second message will be reproduced in car a.

The hold-in coil of the safety device message indexing relay SDMa is energized in the same manner described above for the floor message indexing relay FMa.

Upon energization of the safety device message indexing relay SDMa, its contacts SDM3a will engage to complete a circuit for a safety device timing relay SDTa but to delay the energization of timing relay SDTa, a resistor R6a is inserted in series therewith and a condenser Q6a and resistor R7a is placed in parallel with said relay SDTa. After the expiration of a predetermined time, for example, one-half second, relay SDTa will be energized, contacts SDT1a are engaged to prepare the circuit for the supplementary safety device message indexing relay SSDMa. When the three-second cam 43 makes one complete revolution, it again actuates the cam follower 50 in the switch mechanism 44 and a circuit will be completed from the plus feed line through contacts SDT1a, SDM1a, pull-in coil SSDMa, rectifier RESSDa and contacts 51 in the switch mechanism 44 to the ground line. At this time breaking contacts SSDM1a are opened and the circuit for the message indexing relay SDMa is broken so the first portion of this six-second message cannot be repeated. Energization of the supplementary safety device message indexing relay SSDMa permits the announcement circuit to be completed as described previously and the second portion of this six-second message will be reproduced in car a.

The hold-in coil of the supplementary safety device message indexing relay SSDMa is energized in the same manner as described for the floor message indexing relay FMa. A circuit for the cycling relay CRa is completed in the same manner as described above for the message indexing relay SSDMa in the preferred embodiment.

In FIGURE 8 is illustrated a modification whereby the timing cams are eliminated and electronic circuits are utilized to actuate the switch mechanism 42, 44 and 46. Only the electronic circuit for actuating the switch mechanism 42 is shown and is to be described because the other two circuits are similar therewith. In this modification a permanent magnet is passed through a pulse coil which transmits a pulse to an electronic tube. Upon firing of the tube a relay is energized to actuate the switch mechanism 42 in the same manner as the timing cams 40 and 41.

Permanent magnets 40' and 41' are mounted on the periphery of one edge of the rotating drum 31' and are spaced 180° out of phase in order to obtain two one and one-half second index points on a three-second rotating drum. On the opposite end of the drum a permanent magnet 43' is positioned on the periphery of the drum and another permanent magnet 45' is positioned in advance of, but inset from, the magnet 43'. The magnets 43' and 45' are utilized to actuate the switch mechanisms 44 and 46, respectively, in order to initiate a three-second message and a six-second message as described above in conjunction with the timing cams 43 and 45.

A power source of alternating current provides energy for a pulse coil PC and when the permanent magnet 40' or 41' passes through the energized pulse coil PC, a pulse will be generated. A rectifier RE2' permits the positive portion of the A.C. pulse to appear across the load resistor R3'. A battery B is placed across the line of the pulse circuit to supply a bias for the grid of the gas thyratron tube TT and the resistances R4' and R5' are used to assure that the proper bias and signal ratio will appear at the grid of the tube TT. The resistance R6' is a protective resistance that prevents an overload being placed on the control grid.

A power source of alternating current provides energy for the tube TT, but the tube TT will not fire until a voltage appears on the grid. Rectifier RE2' permits a voltage from the positive portion of the A.C. cycle to appear on the grid of the tube TT so the tube TT will fire during the positive portion of the A.C. cycle in the plate circuit but will not fire during the negative portion of the A.C. cycle in the plate circuit. The tube TT will be extinguished when the grid voltage is removed, i.e., when the permanent magnet 40' has been rotated past the pulse coil PC. A relay RY is placed in series with the plate circuit of the tube TT and will be energized whenever the tube is fired by the permanent magnet passing through the pulse coil PC. A rectifier RE7' is placed across the relay coil RY to prevent relay chatter. Energization of the relay RY actuates the armature 47' in the switch mechanism 42' and a circuit for a floor message indexing relay FM or a direction message indexing relay DM is completed in the same manner as described above when the timing cam 40 or 41 actuated the cam follower 47 in switch mechanism 42.

As it will be understood that this invention is susceptible to modification in order to adapt it to different conditions without departing from the scope thereof, it is intended that all matter contained in the above description or shown on the accompanying drawing shall be interpreted as illustrative and not in a limiting sense.

What is claimed is:

1. In combination with an elevator control system for a plural elevator installation, an announcing system for simultaneously reproducing a plurality of messages in different elevator cars comprising a plurality of reproducing devices, one for each car; a unitary message source containing a variety of messages relating to different conditions of the cars, said messages being divided into groups according to the duration of said messages; means to transmit said messages from said message source to said reproducing devices; message indexing means to control the transmission of said messages, said message indexing means being divided into groups corresponding to the groups of said messages; selecting means for each car actuated in response to said elevator control system to select a message for reproduction in that car and preparing said indexing means for operation; a switch mechanism for each group of indexing means operable to actuate the indexing means of that group; and timing means for each switch mechanism, each timing means actuating its corresponding switch mechanism and being related to said message source to cause the transmission of a selected message to commence at the beginning of that message.

2. In combination with an elevator control system for a plural elevator installation, an announcing system for simultaneously reproducing any one of a variety of messages in each elevator car in response to the operation of that car comprising; a reproducing device for each car; a message source containing a variety of messages relating to different conditions of the cars, said messages being divided into groups of different durations; pick-up and amplifying means for each message to transmit said messages to said reproducing devices; a plurality of selecting relays for each car operable in response to said elevator control system to select an amplified message for reproduction in the reproducing device for that car; a plurality of message indexing relays, one for each message, divided into groups corresponding to the groups of said messages, said message indexing relays being prepared for operation in response to actuation of the selecting relays; a switch mechanism for each group of message indexing relays to operate the prepared message indexing relays of that group; timing means for each switch related to said message source and operating its corresponding switch; lock-out means for each of certain message indexing relays, actuated in response to operation of its corresponding message indexing relay to prevent repetitive transmission of the selected message by its corresponding operated message indexing relay; cycling means for the remainder of said message indexing relays, actuated in response to operation of any one of said remainder of said message indexing relays to prevent immediate repetitive transmission of the selected message by its corresponding operated message indexing relay and to permit a repeat transmission of the selected message by its corresponding operated message indexing relay upon completion of a predetermined cycle; and message preference means for each of certain message indexing relays, actuated in response to the operation of its corresponding message indexing relay whereby its associated message is transmitted in preference to transmission of other messages by their operated message indexing relays.

3. In combination with an elevator control system for operating a plurality of cars serving a plurality of floors, an announcing system for automatically reproducing a variety of messages in said cars in response to the various operations of said cars comprising; a plurality of loud speakers, one in each of said cars; a unitary message source having a rotatable element containing a variety of prerecorded messages relating to different operations of said cars, said messages being divided into groups according to the duration of said messages with at least one group being subdivided into types of messages; a pick-up head for each message to pick up that message from said rotatable element, an amplifier for each pick-up head to amplify the message picked up thereby, each of said pick-up heads being in constant association with said rotatable element whereby each amplified message is constantly available for transmission to each of said cars; a plurality of message indexing relays for each car, operable to control the transmission of said amplified messages to the reproducing device in that car; said message indexing relays being divided into groups corresponding to the groups of said messages with a message indexing relay for each type of messages in said one group of messages and a message indexing relay for each message in the other groups of messages; a plurality of selecting relays for each car, actuated in response to said elevator control system and preparing a selected message indexing relay for operation; additional selecting means for each car for each type of message to select, for reproduction in that car, a message from the messages of that type; a switch mechanism for each group of messages operable to actuate a prepared message indexing relay of that group; and timing means for each switch mechanism, actuating its corresponding switch mechanism and mounted on said rotatable element to cause transmission of any message to commence at the beginning of that message.

4. In combination with an elevator control system for a plurality of elevator cars serving a plurality of floors, an announcing system for simultaneously reproducing a plurality of messages in different elevator cars comprising a plurality of loud speakers, one in each car; a unitary message source comprising a rotatable drum with a magnetic sleeve thereon, said magnetic sleeve having a variety of messages prerecorded on separate message tracks, said messages relating to certain different conditions of said cars and being divided into groups of long duration, intermediate duration and short duration with the group of short duration messages being subdivided into types of messages; a motor for continuously rotating said drum and said sleeve; a magnetic pick-up head for each message for picking up that message from its message track, an amplifier for each pick-up head for amplifying the message picked up thereby, each magnetic pick-up head being in continuous engagement with its associated message track whereby each amplified message is constantly available for transmission to each of said loud speakers; a plurality of message indexing relays, to control the transmission of the amplified messages, one for each message of long duration, one for each message of intermediate duration, and one for each type of short duration messages; a plurality of selecting relays for each car, actuated in response to said elevator control system and preparing said message indexing relays for operation, and additional selecting means for each car for each type of short duration messages to select one of said short duration messages for transmission upon operation of its corresponding message indexing relay; three switch mechanisms, one for each group of messages, operable to actuate the message indexing relays in that group; timing means for each switch mechanism connected to said rotatable drum and operating its corresponding switch mechanism to cause operation of each prepared for operation message indexing relay whereby each selected amplified message is transmitted to the loud speaker in the car for which selecting means are actuated; a lock-out relay for each of certain message indexing relays, actuated in response to operation of its corresponding message indexing relay to prevent repetitive transmission of the selected message by its corresponding operated message indexing relay; and a cycling relay for the remainder of said message indexing relays, actuated in response to operation of any one of said remainder of said message indexing relays to prevent immediate repetitive transmission of the selected message by its corresponding operated message indexing relay, said cycling relay having a time delay device to permit a repeat transmission of the selected message by its corresponding operated message indexing relay upon expiration of a predetermined time interval provided by said time delay device.

5. An announcing system for a plural elevator installation for simultaneously reproducing messages in a plurality of elevator cars comprising; a reproducing device for each car; a unitary message source having a rotatable element containing a variety of messages thereon corresponding to predetermined operating conditions; a separate message track on said rotatable element for each of said messages; said messages being divided into groups according to the duration of said messages; a pick-up device for each message to pick up the message from said message track; an amplifier for each pick-up device for amplifying the message picked up thereby; each pickup device being in constant engagement with its corresponding message track whereby each message is available for transmission to said reproducing devices; a plurality of selecting relays for each car operatively responsive to operation of their associated car to select an amplified message corresponding to said predetermined operating conditions for reproduction in the reproducing device for such associated car; a message indexing relay for each message for each car prepared for operation by said selecting relays for its associated car and controlling the transmission of its corresponding message to the reproducing device for its associated car; energization holding means for each message indexing relay to prevent interruption of the transmission of its corresponding message by cessation of said predetermined operating condition associated with said corresponding message until the complete message is transmitted; said message indexing relays being divided into groups corresponding to the groups of said messages; a switch mechanism for each group of message indexing relays, operable to actuate the prepared message indexing relays of its associated group and their associated energization holding means; and timing means for each switch mechanism, each timing means actuating its corresponding switch mechanism and being connected to said rotatable element to cause the transmission of selected messages to commence at the beginning of said selected messages.

6. The combination of claim 5 in which said timing means comprises at least one cam to operate said switch mechanism.

7. The combination of claim 5 in which said timing means comprises a relay to operate said switch mechanism, an electronic tube to energize said relay, and firing means, mounted on the rotatable drum, to fire said electronic tube.

8. An announcing system in combination with an elevator control system for a plural elevator installation for simultaneously reproducing a plurality of messages in different elevator cars, said announcing system comprising a plurality of reproducing devices, one for each car; a message source containing a variety of messages, each of said messages relating to a predetermined condition of said control system; means to transmit said messages from said message source to said reproducing devices; a plurality of message indexing means, one each of which is provided for each of said messages to control the transmission of its associated message and has energization holding means, selecting means for each car for selecting said messages for reproduction in their respective associated cars and for preparing the indexing means associated with selected messages for operation, said selecting means each being operatively responsive to the occurrence of said predetermined conditions and being operatively independent of each other to cause independent but substantially simultaneous selection of said messages corresponding to said conditions for simultaneous reproduction in said respective cars independently of each other; a switch mechanism actuating the prepared indexing means; and timing means actuating said switch mechanism and being related to said message source to cause the transmission of selected messages to commence at their beginning, said energization holding means being effective under conditions where the predetermined condition relating to the message being transmitted ceases for preventing such cessation from interrupting the transmission of such related message until its completion.

9. In combination with an elevator control system for operating a plurality of cars serving a plurality of floors, an announcing system to reproduce any one of a variety of messages in any one of said cars in accordance with their operation, said announcing system comprising, a plurality of message reproducing devices, one for each of said cars; a single message source containing said variety of messages; selecting means for each car for selecting a message in accordance with the operating condition of the car for which it is provided; means transmitting selected messages from said message source to the reproducing device associated with the car whose operation caused actuation of said selecting means; indexing means operable in response to said selecting means and controlling the transmission of said selected message; and cycling means including a time delay device, said cycling means being operated by said indexing means to actuate the operated indexing means to unoperated condition at the end of transmission of said selected message to prevent immediate repetitive transmission of said selected message, said cycling means causing reoperation of said indexing means upon completion of a predetermined cycle measured by said time delay means to cause said selected message to be retransmitted at the termination of said predetermined cycle.

10. In combination with an elevator control system for operating a plurality of elevator cars serving a plurality of floors, an announcing system for simultaneously reproducing a plurality of messages in said cars comprising, a plurality of reproducing devices, one in each car, a unitary message source comprising a continuously rotatable drum having a variety of messages prerecorded thereon, said messages each relating to a predetermined operating condition of said cars; pickup and amplifying means for each message to transmit said messages from said source to said reproducing devices; a message indexing relay for each message controlling transmission of each message to said reproducing devices; selecting relays for each car, responsive to the operation of said elevator control system for selecting messages corresponding to said predetermined conditions as they occur and for preparing the message indexing relays for actuation to transmit said selected messages to the car for which said relays are provided; a switch mechanism operable to actuate the prepared message indexing relays to cause the transmission of their corresponding messages; timing means mounted on said rotatable drum in fixed relationship to said prerecorded messages to operate said switch mechanism for causing transmission of said selected message to commence at their beginning, and message preference means responsive to the operation of said message indexing relays for causing transmission of a particular selected message in preference to other selected messages by preventing and interrupting the transmission of such other selected messages by their respective said pickup and amplifying means.

References Cited in the file of this patent

UNITED STATES PATENTS

| | | |
|---|---|---|
| 1,539,421 | Kraft | May 26, 1925 |
| 2,009,701 | Miles | July 30, 1935 |
| 2,206,998 | Beizer | July 9, 1940 |
| 2,265,991 | Barker | Dec. 16, 1941 |
| 2,288,683 | Clancy | July 7, 1942 |
| 2,435,066 | Barsh | Jan. 27, 1948 |
| 2,444,818 | Franklin | July 6, 1948 |
| 2,453,911 | Herr | Nov. 16, 1948 |
| 2,483,281 | Herr | Sept. 27, 1949 |
| 2,523,359 | Deible | Sept. 26, 1950 |
| 2,651,770 | Esselman | Sept. 8, 1953 |
| 2,682,318 | Glasser et al. | June 29, 1954 |
| 2,776,732 | Eames | Jan. 8, 1957 |
| 2,828,476 | Eames | Mar. 25, 1958 |